(12) United States Patent
Dayal et al.

(10) Patent No.: US 8,744,510 B2
(45) Date of Patent: Jun. 3, 2014

(54) POWER CONTROL METHOD AND APPARATUS FOR WIRELESS COMMUNICATIONS

(76) Inventors: Pranav Dayal, San Diego, CA (US); Tingfang Ji, San Diego, CA (US)

( * ) Notice: Subject to any disclaimer, the term of this patent is extended or adjusted under 35 U.S.C. 154(b) by 1220 days.

(21) Appl. No.: 12/021,571

(22) Filed: Jan. 29, 2008

(65) Prior Publication Data

US 2008/0227477 A1 Sep. 18, 2008

Related U.S. Application Data

(60) Provisional application No. 60/894,647, filed on Mar. 13, 2007.

(51) Int. Cl.
*H04W 52/10* (2009.01)
*H04W 52/04* (2009.01)

(52) U.S. Cl.
USPC ......................................................... 455/522

(58) Field of Classification Search
None
See application file for complete search history.

(56) References Cited

U.S. PATENT DOCUMENTS

| | | | |
|---|---|---|---|
| 5,257,283 A | 10/1993 | Gilhousen et al. | |
| 5,574,984 A | 11/1996 | Reed et al. | |
| 6,075,974 A | 6/2000 | Saints et al. | |
| 6,188,678 B1 | 2/2001 | Prescott | |
| 6,445,930 B1 | 9/2002 | Bartelme et al. | |
| 6,449,463 B1 | 9/2002 | Schiff | |
| 6,628,956 B2 * | 9/2003 | Bark et al. | 455/522 |
| 6,697,634 B1 | 2/2004 | Hayashi | |
| 6,845,246 B1 | 1/2005 | Steer | |
| 7,010,316 B2 | 3/2006 | Chen | |
| 7,120,189 B2 | 10/2006 | Zeira et al. | |
| 7,171,230 B2 | 1/2007 | Anderson | |
| 7,205,842 B2 | 4/2007 | Gustavsson et al. | |
| 7,239,884 B2 | 7/2007 | Khawand et al. | |
| 7,277,721 B2 * | 10/2007 | Okumura et al. | 455/522 |
| 2003/0064743 A1 | 4/2003 | Chen | |
| 2004/0012907 A1 | 1/2004 | Suzuki | |

(Continued)

FOREIGN PATENT DOCUMENTS

| | | |
|---|---|---|
| CN | 1350730 A | 5/2002 |
| EP | 0715423 B1 | 10/2002 |

(Continued)

OTHER PUBLICATIONS

International Search Report—PCT/US08/056782, International Search Authority—European Patent Office, Jan. 28, 2009.

(Continued)

*Primary Examiner* — Philip Sobutka
(74) *Attorney, Agent, or Firm* — Tyler J. Overall

(57) ABSTRACT

Power control for wireless communication may involve determining the transmit power to be used by a wireless device. A wireless device using open loop power control may select a transmit power based on an open loop power equation where a parameter of the power equation may be based on one or more power control messages received from another wireless device. In some aspects, path loss may be estimated for open loop power control and a value for $\text{Offset\_BS}_{perSS}$ may be obtained from information provided by a base station for closed loop power control. To facilitate a stable combined open-closed loop algorithm, open loop power control may be used to compensate channel changes based on reciprocity, and closed loop power control may be used to compensate interference variations (e.g., as compared to NI provided by a DCD message).

66 Claims, 8 Drawing Sheets

(56) References Cited

U.S. PATENT DOCUMENTS

| | | |
|---|---|---|
| 2004/0147274 A1 | 7/2004 | Khawand et al. |
| 2005/0176455 A1 | 8/2005 | Krishnan et al. |
| 2006/0146762 A1 | 7/2006 | Kuroda et al. |
| 2008/0069075 A1 | 3/2008 | Holl et al. |

FOREIGN PATENT DOCUMENTS

| | | |
|---|---|---|
| EP | 1551112 | 7/2005 |
| EP | 1855391 | 11/2007 |
| EP | 1876854 | 1/2008 |
| JP | 2000261374 A | 9/2000 |
| JP | 2002539707 | 11/2002 |
| JP | 2006191312 A | 7/2006 |
| JP | 2006262502 A | 9/2006 |
| RU | 2172067 | 8/2001 |
| WO | WO96/31014 A1 | 10/1996 |
| WO | 0055976 | 9/2000 |
| WO | WO-03009481 A1 | 1/2003 |
| WO | WO-2006071162 A1 | 7/2006 |
| WO | WO-2006104208 A1 | 10/2006 |
| WO | 2008/112580 | 9/2008 |

OTHER PUBLICATIONS

Written Opinion—PCT/US08/056782, International Search Authority—European Patent Office, Jan. 28, 2009.
Partial International Search Report—PCT/US08/056782—International Search Authority, European Patent Office—Oct. 8, 2008.
Taiwanese Search report—097108244—TIPO —Nov. 30, 2011.

* cited by examiner

POWER CONTROL METHOD AND APPARATUS FOR WIRELESS COMMUNICATIONS

CLAIM OF PRIORITY UNDER 35 U.S.C. §119

This application claims the benefit of and priority to commonly owned U.S. Provisional Patent Application No. 60/894,647, filed Mar. 13, 2007, the disclosure of which is hereby incorporated by reference herein.

BACKGROUND

1. Field

This application relates generally to wireless communication and more specifically, but not exclusively, to controlling transmit power of an apparatus.

2. Introduction

An electronic device may support one or more communication technologies to transmit information to and receive information from other electronic devices. For example, a wireless device may support wireless technologies such as WiMAX, WiFi, and CDMA to communicate over airwaves with another device.

In a wireless device, the selection of a power level at which signals are transmitted may be based on various factors. For example, when a signal is transmitted at a higher transmission power, an associated receiving device may more readily recover any data transmitted via that signal. However, transmitting at high power levels may cause interference at neighboring wireless devices and may result in reduced battery life for mobile devices.

In view of the above, various schemes have been developed in an attempt to maintain an optimum balance between high quality transmissions and acceptable transmit power levels. For example, the IEEE 802.16 standard describes a power scheme where a subscriber station may determine transmit power for a reverse link using either a closed loop power control procedure or an open loop power control procedure. Under closed loop power control, a base station transmits power control messages to the subscriber station and the subscriber station selects a transmit power level based on these messages. Under open loop power control, the subscriber station selects a transmit power level based on a power equation. Here, the subscriber station may determine some of the parameters for the power equation on its own and may obtain other parameters from the base station.

SUMMARY

A summary of sample aspects of the disclosure follows. It should be understood that any reference to the term aspects herein may refer to one or more aspects of the disclosure.

The disclosure relates in some aspect to power control for wireless communication. In particular, the disclosure relates to techniques associated with determining the transmit power to be used by a wireless device.

In some aspects, a wireless device using open loop power control selects a transmit power level based on an open loop power equation. Here, a parameter of the power equation may be based on one or more messages received from another wireless device. For example, when a subscriber station is using open loop power control, an associated base station may transmit messages including information relating to variations in interference observed at the base station. The subscriber station may then use the received information to provide a parameter for the power equation. For example, in an IEEE 802.16-related implementation, the received messages may include information to provide an $Offset\_BS_{perSS}$ parameter for the open loop power equation.

Accordingly, in some aspects, power control for a wireless device may be based on a combination of open loop power control and closed loop power control. For example, a subscriber station may select a transmit power by using an open loop power equation, where a parameter for the power equation is based on one or more unicast closed loop power control messages received from a base station. Here, the power control messages may specify a power offset value (e.g., an incremental increase or decrease in power) based on variations in interference observed by the base station.

In some aspects an open loop power equation includes a parameter relating to path loss over a reverse link from a subscriber station to a base station. In some implementations, the subscriber station may determine the path loss parameter based on an estimate of path loss associated with a forward link from the base station to the subscriber station. For example, the subscriber station may estimate the forward link path loss by comparing the power level at which signals are received on the forward link with a known power level that the base station used to transmit the signals.

The determination of path loss may be based on various factors. For example, in some implementations the subscriber station may estimate the path loss on the forward link by processing control signal that are received via the forward link. In some implementations the subscriber station may specify the path loss for the reverse link based on antennas configurations of the base station and the subscriber station for the forward and reverse links. In some implementations the subscriber station may filter its estimates of path loss for the forward link to mitigate large and/or transient changes in the path loss estimate. In some implementations the subscriber station may estimate the path loss on the forward link based on movement of the subscriber station. In some implementations the subscriber station may determine transmit power based on the location of the subscriber station.

The power control messages transmitted by a base station also may be based on various factors. For example, in some implementations a base station may define a transmit power offset based on interference observed at the base station. In some implementations a base station may define a transmit power offset based on a level of quality of service associated with a subscriber station. In some implementations a base station may define a transmit power offset based on hybrid automatic repeat-request ("HARQ") associated with a subscriber station. In some implementations a base station may define a power offset based on the number of receive antennas. In some implementations a base station may define a power offset based on gain associated with at least one receive antenna.

In some aspects, provisions may be made to facilitate maintaining synchronization between open loop and closed loop modes of operations and to facilitate switching between these modes of operation. For example, when switching from closed loop to open loop, provisions may be made to specify appropriate parameters for the open loop power equation based on the transmit power level that was previously used during closed loop operation. Also, provisions may be made to maintain synchronization between the power control operations of a base station and a mobile station and to provide error recovery in the event such synchronization is lost.

BRIEF DESCRIPTION OF THE DRAWINGS

These and other sample aspects of the disclosure will be described in the detailed description and the appended claims that follow, and in the accompanying drawings, wherein:

Figure 1:
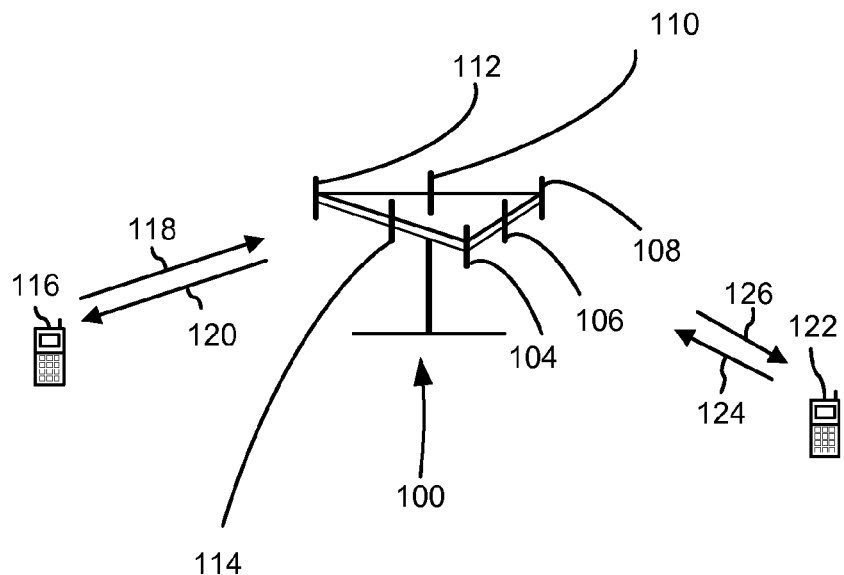
FIG. 1 is a simplified diagram of several sample aspects of a communication system.

In accordance with common practice the various features illustrated in the drawings may not be drawn to scale. Accordingly, the dimensions of the various features may be arbitrarily expanded or reduced for clarity. In addition, some of the drawings may be simplified for clarity. Thus, the drawings may not depict all of the components of a given apparatus (e.g., device) or method. Finally, like reference numerals may be used to denote like features throughout the specification and figures.

DETAILED DESCRIPTION

Various aspects of the disclosure are described below. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. Furthermore, an aspect may comprise at least one element of a claim.

For illustration purposes, the discussion that follows describes various components and operations of a wireless system where a subscriber station determines a transmit power to be used for transmissions to a base station over a reverse link. It should be appreciated, however, that the teachings herein may be applicable to other types of wireless devices and communication systems.

Referring to FIG. 1, a sample multiple access wireless communication system is illustrated. An access point 100 ("AP") includes multiple antenna groups: one group including antennas 104 and 106, another group including antennas 108 and 110, and an additional group including antennas 112 and 114. In FIG. 1, only two antennas are shown for each antenna group. In practice, however, more or fewer antennas may be utilized for each antenna group. An access terminal 116 ("AT") is in communication with the antennas 112 and 114, where the antennas 112 and 114 transmit information to the access terminal 116 over a forward link 120 and receive information from the access terminal 116 over a reverse link 118. An access terminal 122 is in communication with the antennas 106 and 108, where the antennas 106 and 108 transmit information to the access terminal 122 over a forward link 126 and receive information from the access terminal 122 over a reverse link 124. In a frequency division duplex ("FDD") system, communication links 118, 120, 124 and 126 may use different frequency for communication. For example, the forward link 120 and the reverse link 118 may use different frequencies.

Each group of antennas and/or the area in which they are designed to communicate may be referred to as a sector of the access point. Thus, each antenna group may be designed to communicate to access terminals in a sector of the areas covered by access point 100.

For communication over the forward links 120 and 126, the transmitting antennas of access point 100 may utilize beam-forming to improve the signal-to-noise ratio of the forward links for the different access terminals 116 and 122. Also, an access point that uses beam-forming to transmit to access terminals scattered randomly through its coverage area may cause less interference to access terminals in neighboring cells than an access point that uses a single antenna to transmit to all of the access terminals in its coverage area.

Sample operations of the system of FIG. 1 will now be discussed in more detail in conjunction with the flowcharts of FIGS. 2-6. For convenience, the operations of FIGS. 2-6 (or any other operations discussed or taught herein) may be described as being performed by specific components (e.g., components of a system 700 shown in FIG. 7). It should be appreciated, however, that these operations may be performed by other types of components and may be performed using a different number of components. It also should be appreciated that one or more of the operations described herein may not be employed in a given implementation.

Figure 2:
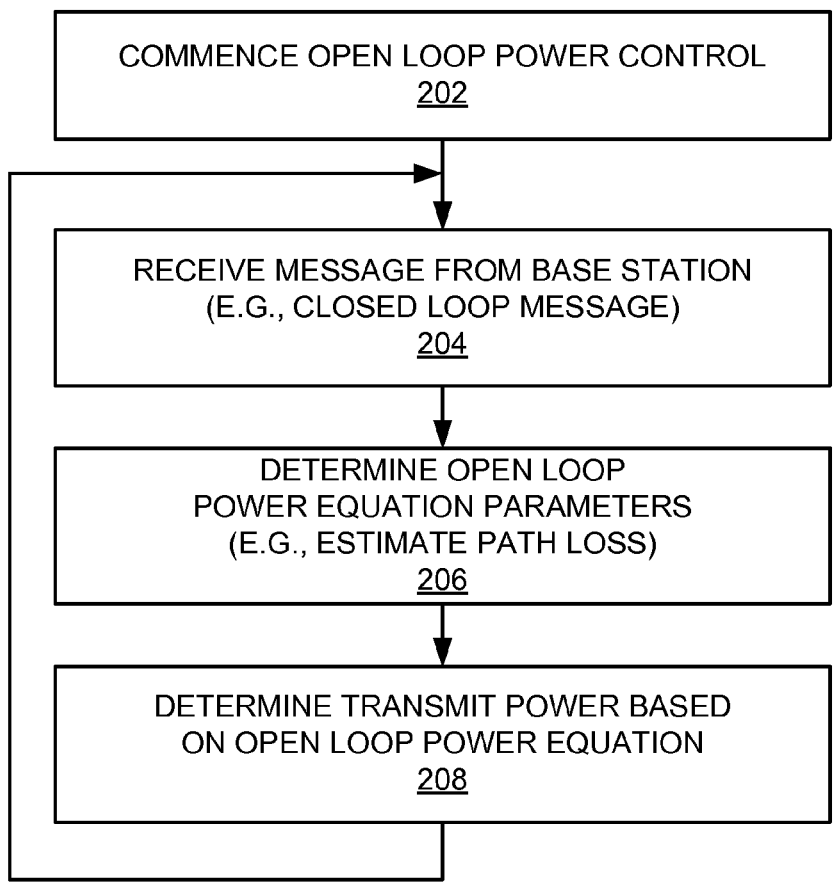
FIG. 2 is a flowchart of several sample aspects of power control operations.
Figure 3:
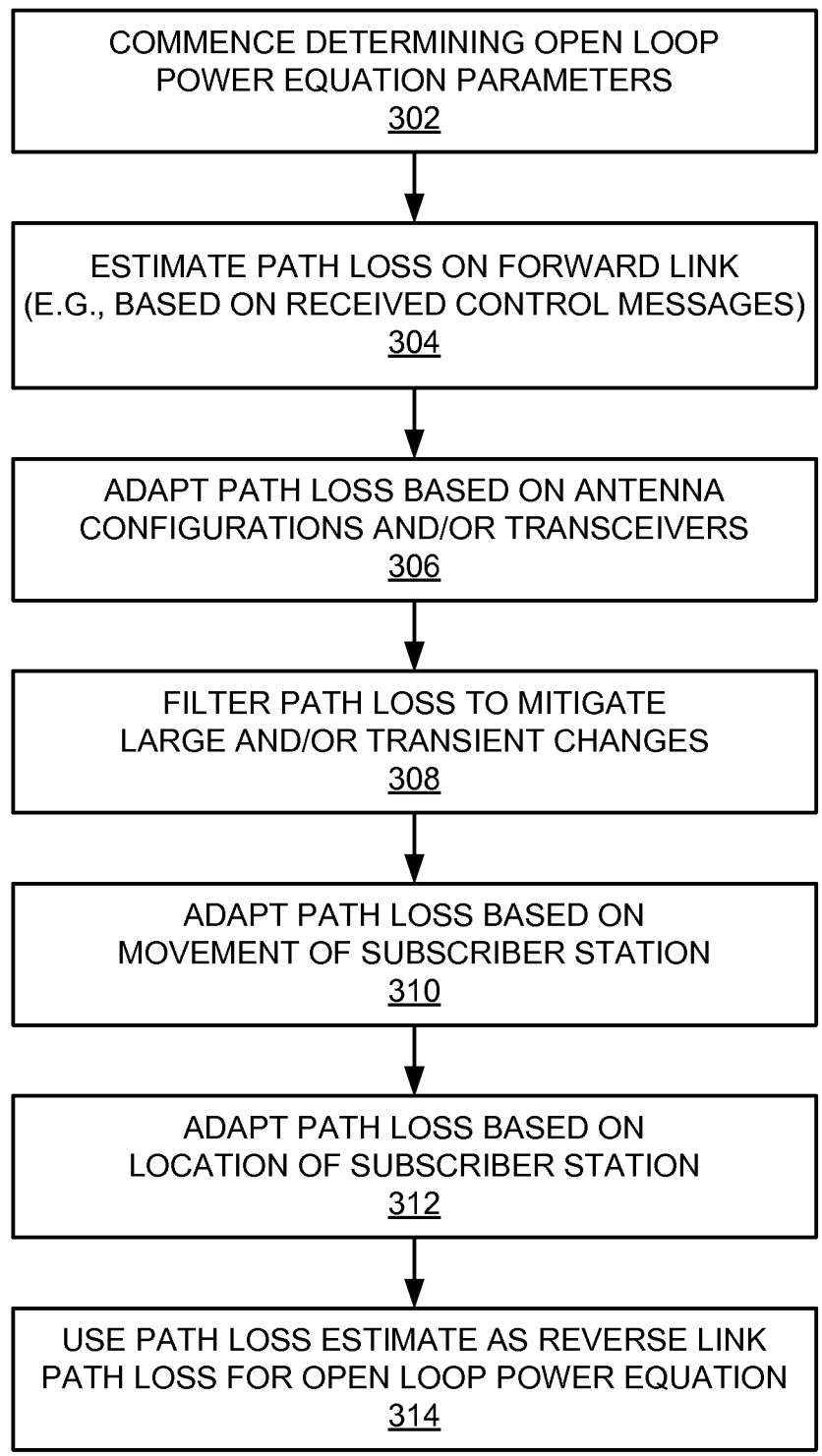
FIG. 3 is a flowchart of several sample aspects of operations that may be performed to determine path loss.

Referring initially to FIG. 2, as represented by block 202, at some point in time a subscriber station (e.g., subscriber station 702 of FIG. 7) commences open loop power control. When using open loop power control, the subscriber station 702 may employ an open loop power equation to determine the transmit power it will use for transmission over a wireless communication link. The commencement of open loop power control is discussed in more detail below in conjunction with FIG. 5.

Figure 7:
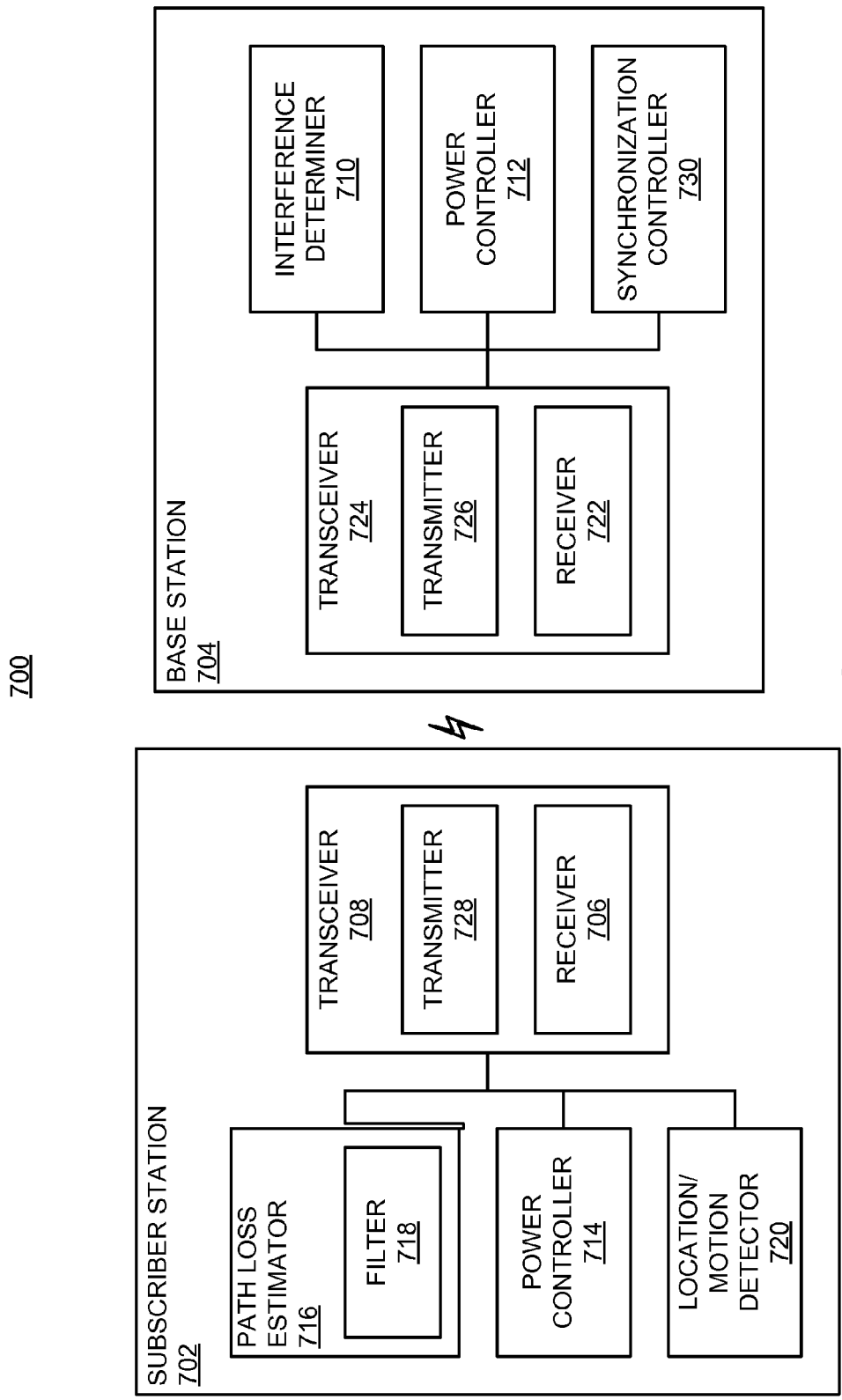
FIG. 7 is a simplified block diagram of several sample aspects of wireless devices of a communication system.

As represented by block 204, during open loop power control the subscriber station 702 (e.g., a receiver component 706 of a transceiver 708) may receive one or messages from an associated base station (e.g., base station 704 of FIG. 7). In some aspects, such a message comprises an indication relating to an adjustment of the transmit power to be used during open loop power control. Here, the base station 704 may generate the message based on any variations in interference that it observes (e.g., via an interference determiner component 710). For example, if the component 710 detects an increase in interference, the base station 704 (e.g., a power controller 712) may generate a message comprising an indication to increase transmit power. Conversely, if the component 710 detects a decrease in interference, the message may comprise an indication to decrease transmit power. In a typical implementation, the base station 704 may transmit messages comprising power control indications to the subscriber station 702 on a repeated basis (e.g., whenever the base station 704 observes a change in interference).

As represented by block 206, the subscriber station 702 determines the open loop power equation parameters to be used to calculate transmit power. In some implementations the power equation takes the form of Equation 1:

$$P = L + C/N + NI - 10\log_{10}(R) + \text{Offset\_SS}_{perSS} + \text{Offset\_BS}_{perSS} \quad (1)$$

A brief description of the parameters of Equation 1 follows. P is the transmit power level in dBm. L is the forward link path loss (e.g., an estimate of the path loss). C/N is a carrier-to-noise offset for the selected coding scheme (e.g., the selected modulation/FEC rate). NI is an estimated average power level in dBm of noise and interference at the base station. NI is repeatedly broadcast by the base station 704 to its associated subscriber stations (e.g., broadcast via a DCD message). R is the repetition rate (e.g., for the selected modulation/FEC rate). $\text{Offset\_SS}_{perSS}$ is an offset parameter provided by the subscriber station 702 (e.g., adjusted depending on the errors seen by the subscriber station 702). $\text{Offset\_BS}_{perSS}$ is an offset parameter maintained at the subscriber station that is based on information provided by the base station 704. For example, an $\text{Offset\_BS}_{perSS}$ value may represent the accumulation of all power control commands collected by the subscriber station in conjunction with the receipt of various power control messages (e.g., as defined by the 802.16 standard). As will be discussed in more detail below, this offset parameter may be based, at least in part, on the power control indication received at block 204.

As represented by block 208, the subscriber station 702 (e.g., a power controller component 714) may, on a repeated basis, determine the transmit power for the reverse link based on the power equation. For example, the subscriber station 702 may recalculate the transmit power whenever it receives a power control message from the base station 704 (e.g., block 204). In addition, as will be discussed in more detail in conjunction with FIG. 3, the subscriber station 702 may repeatedly determine (e.g., estimate) the path loss to the base station 704 to account for changes in an associated communication channel over time (e.g., block 206). In this case, whenever the subscriber station 702 detects a variation in path loss, the subscriber station 702 may adjust its transmit power accordingly.

In some aspects, the operations of FIG. 2 advantageously provide a power control scheme where open loop and closed loop operations work together to provide more effective power control. Here, a subscriber station operating in open loop mode may adjust its transmit power based on conditions it observes (e.g., the current estimated path loss), while also taking into account variations in interference observed by the base station (e.g., closed loop information).

The path loss parameter for the power equation may be defined (e.g., adjusted) in various ways and based on one or more factors. Several examples of such factors will be described in conjunction with FIG. 3.

As represented by block 302, at some point in time the subscriber station 702 will commence determining (e.g., updating or acquiring) the parameters for the open loop power equation. In a typical implementation, the subscriber station 702 will perform these operations on a repeated basis. For example, in some embodiments the subscriber station 702 may periodically determine the power equation parameters (e.g., estimate path loss). In some embodiments the subscriber station 702 may determine the power equation parameters whenever it receives a corresponding message (e.g., a power control indication) from the base station 704. In some embodiments the subscriber station 702 may determine the power equation parameters whenever it transmits data (e.g., every frame).

In some aspects it is assumed that the forward link path loss is sufficiently similar to the reverse link path loss for purposes of the power equation. In other words, path loss may be determined (e.g., estimated) based on assumed reciprocity between the channel conditions (e.g., path losses) for the forward and reverse links. Accordingly, as represented by block 304, the subscriber station 702 (e.g., a path loss estimator 716) may estimate the path loss on the forward link. This process may involve, for example, measuring the power level (e.g., power spectral density) of a signal received by the receiver 706 and comparing that power level with the power level at which the signal was transmitted by the base station 704. To this end, the subscriber station 702 may be configured to acquire information regarding the transmit power used by the base station 704 to transmit this signal. For example, the transmit power level used by the base station 704 for certain signals may be known or the base station 704 may send a message to the subscriber station 702 including such power level information.

The forward link path loss may be estimated based on various types of signals received over the forward link. For example, in some implementations the subscriber station 702 will estimate forward link path loss based on control signals that are received over the forward link from the base station 704.

As represented by block 306, in some implementations the subscriber station 702 (e.g., the estimator 716) may estimate the path loss based on the antenna configurations of the base station 704 and the subscriber station 702. Here, the subscriber station 702 may take into account that in some situations a different number of transmit and receive antennas may be used for the forward and reverse links. For example, on the forward link the base station 704 may use one antenna (along with certain precoding and beam-forming) to transmit while the subscriber station 702 uses two antennas to receive (with MRC/MMSE combining). However, on the reverse link the subscriber station 702 may use one antenna to transmit and the base station 704 may use one antenna to receive. In such a case, the subscriber station may adapt (e.g., increase) the path loss estimate for the forward link to provide a more accurate estimate of reverse link path loss.

In some implementation a calibration procedure may be employed to adjust the path loss estimate based on the different characteristics of the transceivers used in the forward and reverse links. For example, a self-calibration procedure or an over-the-air calibration procedure may be employed here.

As represented by block 308, in some implementations the subscriber station 702 may adjust an estimate of path loss in an attempt to mitigate large changes in the estimated path loss and/or transient changes in the estimated path loss. In some aspects these operations may be accomplished using a filtering technique (e.g., a filter component 718). Under some circumstances the subscriber station 702 may employ a filter (e.g., a filter bank) having a relatively long length to eliminate sudden changes in the estimate of path loss. For example, in the event there is a relatively large change in the initial estimate of path loss (e.g., based on a large change in received power over the forward link), the filter may cause a gradual (e.g., incremental) change in the current path loss parameter used for the power equation. In this case, the magnitude of the path loss parameter may eventually "catch up" with the magnitude of the change in the initial estimate of path loss. Conversely, in the event there is a transient change in the initial estimate of path loss, the filtering effect may cause either no change or a reduced change in the path loss parameter.

As represented by block 310, in some implementations the subscriber station 702 (e.g., the estimator 716) may define a path loss estimate based on movement of the subscriber station 702. For example, in the event the subscriber station 702 is moving relatively quickly and/or in a particular direction, the current estimate of path loss may only be accurate for a short period of time. Thus, in these cases it may be desirable for the subscriber station 702 to more quickly track changes in path loss and adapt to the new path loss estimates.

In some implementations this may be accomplished through the use of a different (e.g., shorter length) filter. Accordingly, the subscriber station 702 may be configured to change the filter it is currently using (e.g., switch filters) based on the velocity and/or direction of the motion of the subscriber station 702.

The subscriber station 702 may measure movement in a variety of ways. For example, in some implementations the subscriber station 702 may include a location/motion detector component 720 (e.g., an accelerometer, a GPS receiver, and so on) that tracks motion of the subscriber station 702 (e.g., based on changes in the current location).

As represented by block 312, in some implementations the subscriber station 702 (e.g., the estimator 716) may define a path loss estimate based the location of the subscriber station 702 (e.g., as determined by the location/motion detector 720). For example, when the subscriber station 702 is near the edge of a cell (e.g., near the edge of a coverage area of a sector associated with the base station 704), it may be desirable to limit transmit power to avoid interfering with wireless devices in neighboring cells (or sectors). Thus, under some circumstances, even though an increase in path loss may call for an increase in reverse link transmit power, the subscriber station 702 may provide a reduced estimate of path loss to reduce the probability that the subscriber station 702 will interfere with neighboring devices.

In some aspects the subscriber station 702 may determine its location or acquire information concerning its location by estimating the path loss to several nearby wireless devices. For example, the subscriber station 702 may estimate the path loss from devices in neighboring sectors as well as the path loss from its own sector (e.g., from the base station 704). Here, if the subscriber station 702 determines that these path losses are comparable (e.g., due to the subscriber station being near a cell edge), the subscriber station 702 may adjust (e.g., decrease) its initial path loss estimate for the power equation. Conversely, if the path losses to the neighboring sectors are higher than the path loss to the sector of the subscriber station 702 (e.g., due to the subscriber station 702 being relatively close to the base station 704), the subscriber station 702 may simply use the initial path loss estimate in the power equation.

As represented by block 314, once the subscriber station 702 obtain its final estimate of the path loss as described above, the subscriber station 702 uses that value as the reverse link path loss along with the other power equation parameters to determine the open loop transmit power. It should be appreciated that some of the adaptations discussed above may be used to adapt some other parameter associated with the power equation. For example, in the event it is determined that transmit power should be adjusted downward, the subscriber station may reduce a parameter other than path loss or may simply reduce the power level resulting from the power equation.

Figure 4:
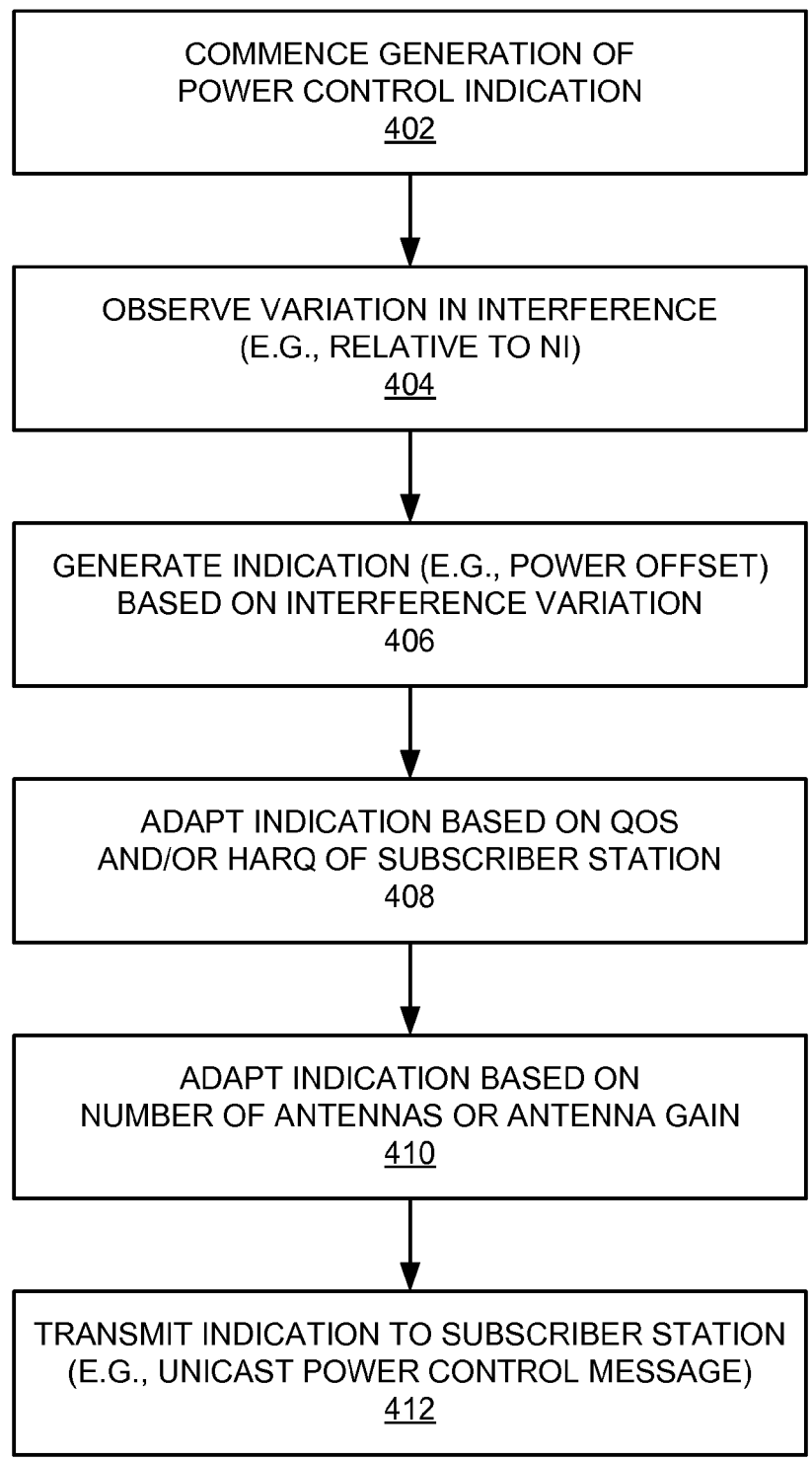
FIG. 4 is a flowchart of several sample aspects of operations that may be performed to provide a power control indication.

Referring now to FIG. 4, several operations that the base station 704 may perform to provide a power control indication will be described commencing at block 402. In a typical implementation, the base station 704 will perform these operations on a repeated basis. For example, in some embodiments the base station 704 may generate an indication whenever it detects a variation in interference. In this case, the procedure may be limited in some manner to prevent the operation from being performed too frequently. In some embodiments the base station 704 may generate an indication every time it transmits data (e.g., every frame) or expects to receive data. In some embodiments the base station 704 may periodically generate an indication.

As represented by block 404, the base station 704 is configured to determine whether it is experiencing any interference, and if so, the extent of that interference. For example, in some embodiments a receiver component 722 of a transceiver 724 may monitor a given channel for interfering signals (e.g., on a repeated basis as discussed above). In addition, in some embodiments the base station 704 may estimate interference in an indirect manner (e.g., based on a received data error rate).

In some aspects, the base station 704 (e.g., the interference determiner 710) may determine whether there is a variation in the interference observed at the base station 704 relative to previously observed interference. For example, at a given point in time the interference determiner 710 may generate the NI parameter indication of the magnitude (e.g., power level) of the interference currently observed by the base station 704. The interference determiner 710 may then continue monitoring to determine whether there are any variations in the magnitude of the observed interference relative to the value of the most recent NI parameter that the base station 704 generated and/or relative to the previous power control indication that the base station 704 transmitted.

As represented by block 406, the base station 704 may generate an indication relating to whether there has been a variation in interference at block 404. For example, in the event there is a variation, the power controller 712 may generate an indication that specifies an incremental change in a transmit power offset parameter based on the degree of the variation in interference, or the power controller 712 may generate an indication that specifies a new transmit power offset parameter based on the variation in observed interference. Thus, in the former case the base station 704 may generate a power control indication that may be used to increase or decrease an offset (e.g., $\text{Offset\_BS}_{perSS}$) maintained at the subscriber station for the open loop power equation, while in the latter case the base station may simply provide a new value for the offset (e.g., $\text{Offset\_BS}_{perSS}$) used by the subscriber station in the open loop power equation.

As represented by block 408, the base station 704 may generate the power control indication based on quality of service or HARQ associated with the subscriber station 702. For example, if a relatively high quality of service is assigned to one or more traffic flows associated with the subscriber station 702, the power controller 712 may specify a larger value for the power control indication. Similarly, the power controller 712 may define a larger value for the power control indication if the HARQ termination point specifies that packets are to be terminated relatively quickly at the subscriber station 702. As a specific example of the above, in response to an increase in interference, a larger magnitude power control indication may be specified for voice traffic as opposed to best-effort traffic. Here, it should be appreciated that the base station 704 may determine the quality of service or HARQ associated with the subscriber station 702 based on communications between the base station 704 and the subscriber station 702.

As represented by block 410, the base station 704 may generate the power control indication based on the number of receive antennas at the base station 704 and/or the gain of each of these antennas. For example, the power controller 712 may define a different value for the power control indication if one receive antenna is being used as opposed to if two or more antennas are being used. Similarly, the power controller 712 may define a different value for the power control indication when utilizing a lower antenna gain as opposed to when a higher antenna gain is used.

As represented by block 412, the base station 704 (e.g., a transmitter component 726) transmits the indication to the subscriber station 702. The message from the base station 704 may take a variety of forms. In some implementations the message may comprise a dedicated power control message. In some implementations a non-power-specific message may be used to send a power control indication along with other information. In some aspects, the message may comprise a unicast message specifically directed to the subscriber station 702 (e.g., via an information element). As mentioned above, in some aspects the message may comprise information that specifies the Offset_BS$_{perSS}$ parameter for the open loop power equation or may comprise information that is used to alter that parameter.

Figure 5:
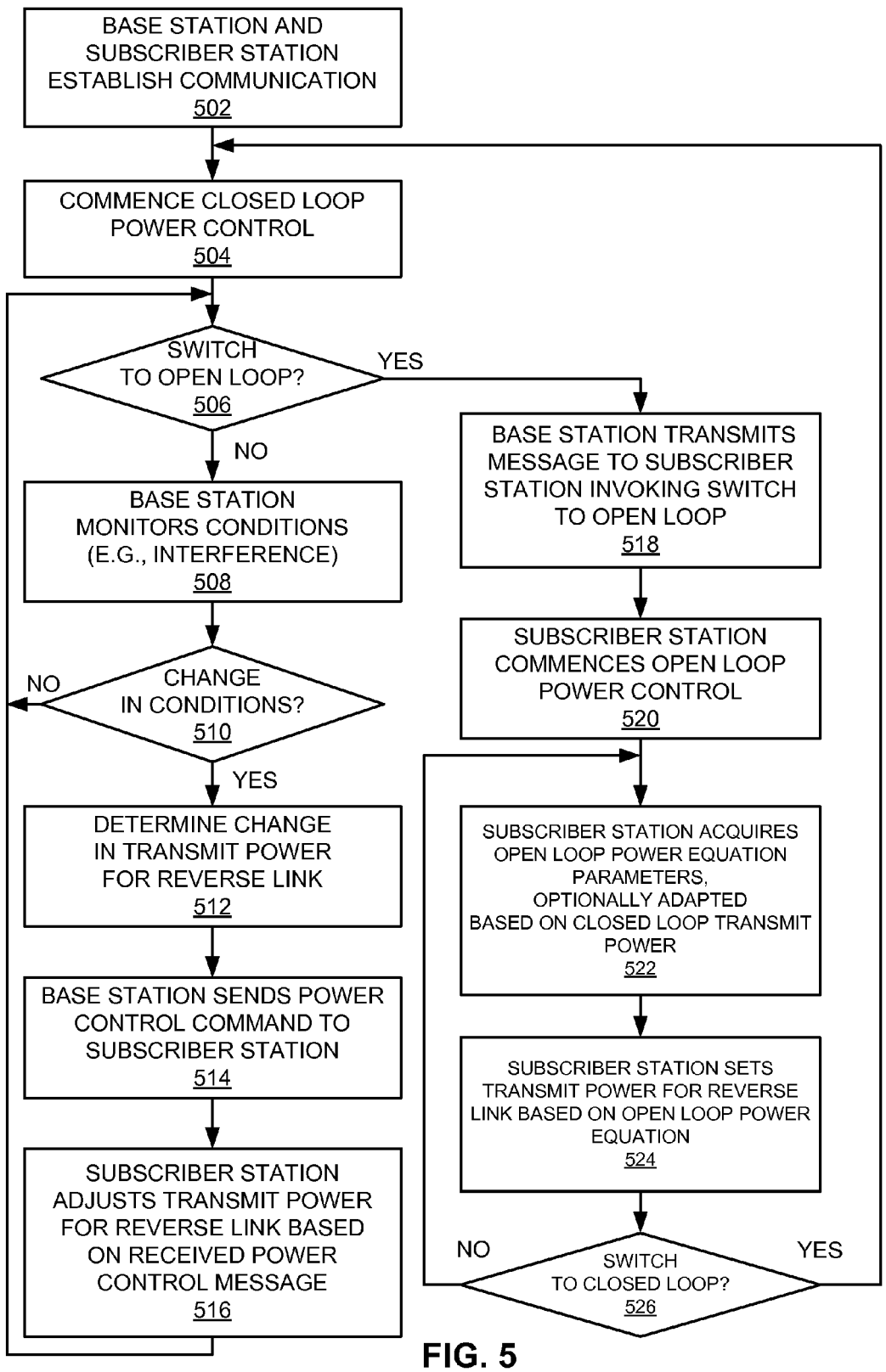
FIG. 5 is a flowchart of several sample aspects of operations that may be performed to switch between closed loop power control and open loop power control.

Referring now to FIG. 5, sample operations associated with transitioning between closed loop power control and open loop power control will now be described. The described operations commence after the base station 704 and the subscriber station 702 associate with one other as represented by block 502. As represented by block 504, closed loop power control may be the default power control mode. At some point in time, however, the base station 704 may elect to initiate a switch to open loop power control (block 506). For example, an open loop power control mode may be selected to reduce the overhead associated with sending power control messages from the base station 704 to the subscriber station 702. Sample operations associated with open loop power control will be described in conjunction with blocks 518-526 below.

Sample operations associated with closed loop power control are described at blocks 508-516. As represented by block 508, the base station 704 monitors conditions at the base station 704 such as observed interference. In the event there is a change in conditions (block 510), the base station 704 (e.g., the power controller 712) may determine whether and to what extent to change the transmit power for the reverse link (block 512). At block 514, the base station 704 may thus send a power control command to the subscriber station 702. Here, the power control command may specify an incremental increase or decrease in transmit power (e.g., using a value designated in dB). In response to this message, the subscriber station 702 adjusts its transmit power for the reverse link by the designated amount (block 516). The above operations may then be repeated until a switch is made to open loop power control.

Referring now to the open loop power control operations, as represented by blocks 518 and 520, the subscriber station 702 may commence open loop power control in response to a message received from the associated base station 704. As represented by block 522 the subscriber station 702 may acquire the parameters for the open loop power equation as discussed herein.

When switching from closed loop to open loop, provisions may be made to prevent relatively large changes in the reverse link transmit power. For example, the power controller 714 may define the initial parameters (e.g., L, NI, offsets) for the power equation so that the resulting transmit power is substantially similar to the last transmit power that was used in closed loop mode. In some instances this may be accomplished, for example, by weighting (e.g., temporarily) one of more the parameters.

As represented by block 524, the subscriber station 702 determines the transmit power based on the power equation and uses the designated power level for its reverse link transmissions as discussed herein. As represented by block 526, the above open loop operations may be repeated until a switch is made to closed loop power control. Here, a switch back to closed loop mode may be invoked by a message from the base station 704 (e.g., similar to the message at block 518).

Figure 6:
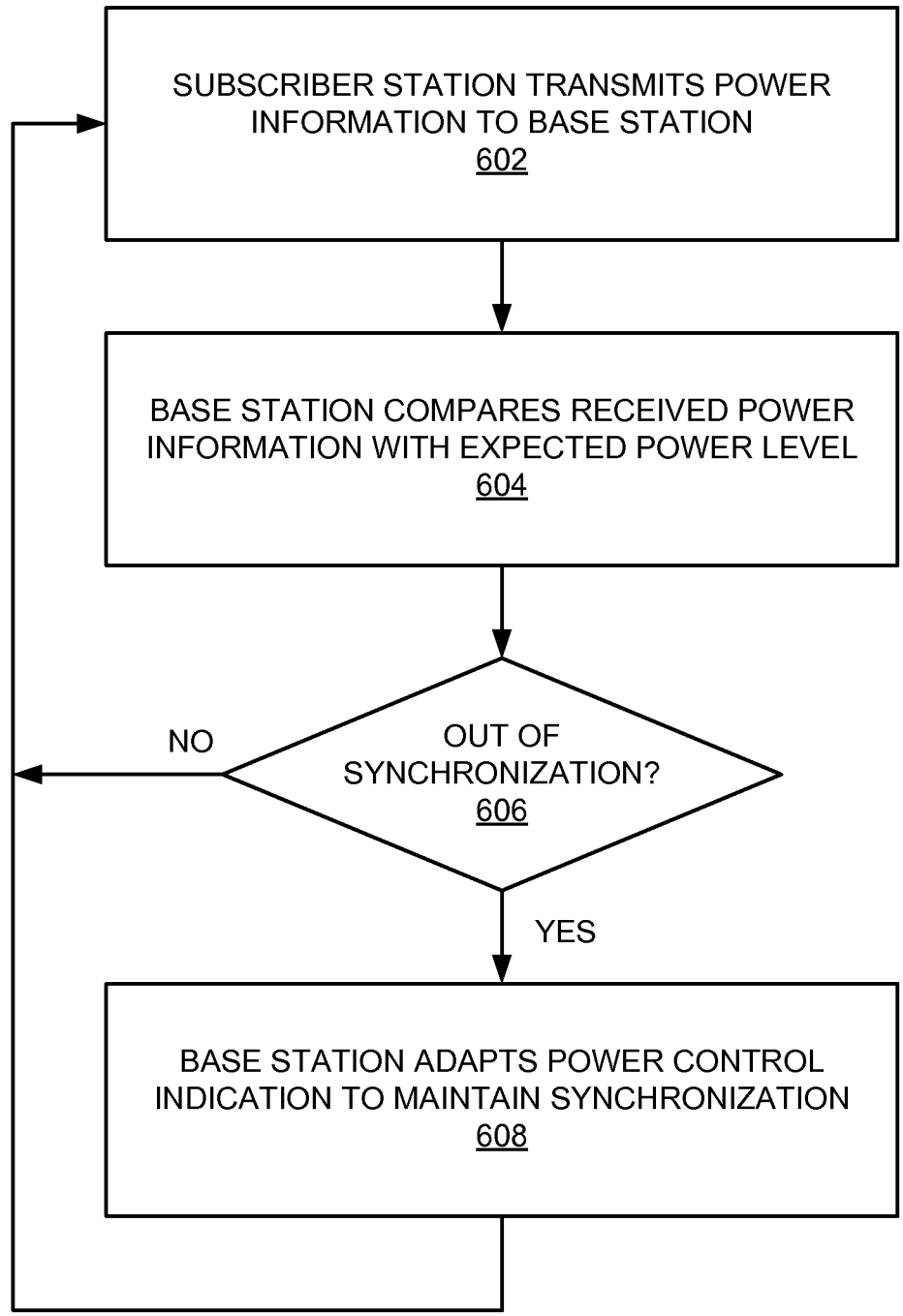
FIG. 6 is a flowchart of several sample aspects of operations that may be performed to synchronize closed loop and open loop operations.

Referring now to FIG. 6, in some implementations provisions may be made to maintain synchronization of the power control operations of the base station 704 and the subscriber station 702. For example, as discussed herein the base station 704 may transmit messages that instruct the subscriber station 702 to incrementally change its transmit power. However, if the subscriber station 702 does not receive one or more of these messages, the power control operations of the base station 704 and the subscriber station 702 may no longer be synchronized. In other words, the base station 704 may be expecting the subscriber station 702 to transmit at one power level while the subscriber station 702 determines that it should transmit at another power level.

FIG. 6 illustrates several sample operations that may be employed to maintain (e.g., keep or restore) such synchronization. At block 602, the subscriber station 702 (e.g., a transmitter component 728) may transmit information to the base station 704 indicative of the current transmit power used by the subscriber station 702 on the reverse link. At the base station 704, a message including this information is received by the receiver 722 and may be provided to a synchronization controller 730. Here, the synchronization controller 730 may compare the received power information with an expected power level (block 604). As represented by block 606, in the event these values are different (e.g., the difference is greater than a defined delta), the power controller 712 may define (e.g., adapt) the power control indication to maintain (e.g., regain) synchronization and send the revised indication to the subscriber station 702 (block 608). The base station 704 and the subscriber station 702 may perform the operations of FIG. 6 on a regular (e.g., periodic) basis in an attempt to maintain power control synchronization.

A wireless communication system as taught herein may be deployed to provide various types of communication content such as voice, data, and so on. Such a system may comprise multiple-access systems capable of supporting communication with multiple users by sharing the available system resources (e.g., bandwidth and transmit power). Examples of such multiple-access systems include code division multiple access ("CDMA") systems, time division multiple access ("TDMA") systems, frequency division multiple access ("FDMA") systems, 3GPP LTE systems, orthogonal frequency division multiple access ("OFDMA") systems, and so on.

A wireless multiple-access communication system may simultaneously support communication for multiple wireless terminals. As mentioned above, each terminal may communicate with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-in-single-out, multiple-in-single-out, or a multiple-in-multiple-out ("MIMO") system.

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $Ns \leq \min\{N_T, N_R\}$. Each of the Ns independent channels corresponds to a dimension. The MIMO system may provide improved performance (e.g., higher throughput and/or greater reliability) if the additional dimensionalities created by the multiple transmit and receive antennas are utilized.

A MIMO system may support time division duplex ("TDD") and frequency division duplex ("FDD"). In a TDD system, the forward and reverse link transmissions are on the same frequency region so that the reciprocity principle allows the estimation of the forward link channel from the reverse link channel. This enables the access point to extract transmit beam-forming gain on the forward link when multiple antennas are available at the access point.

Figure 8:
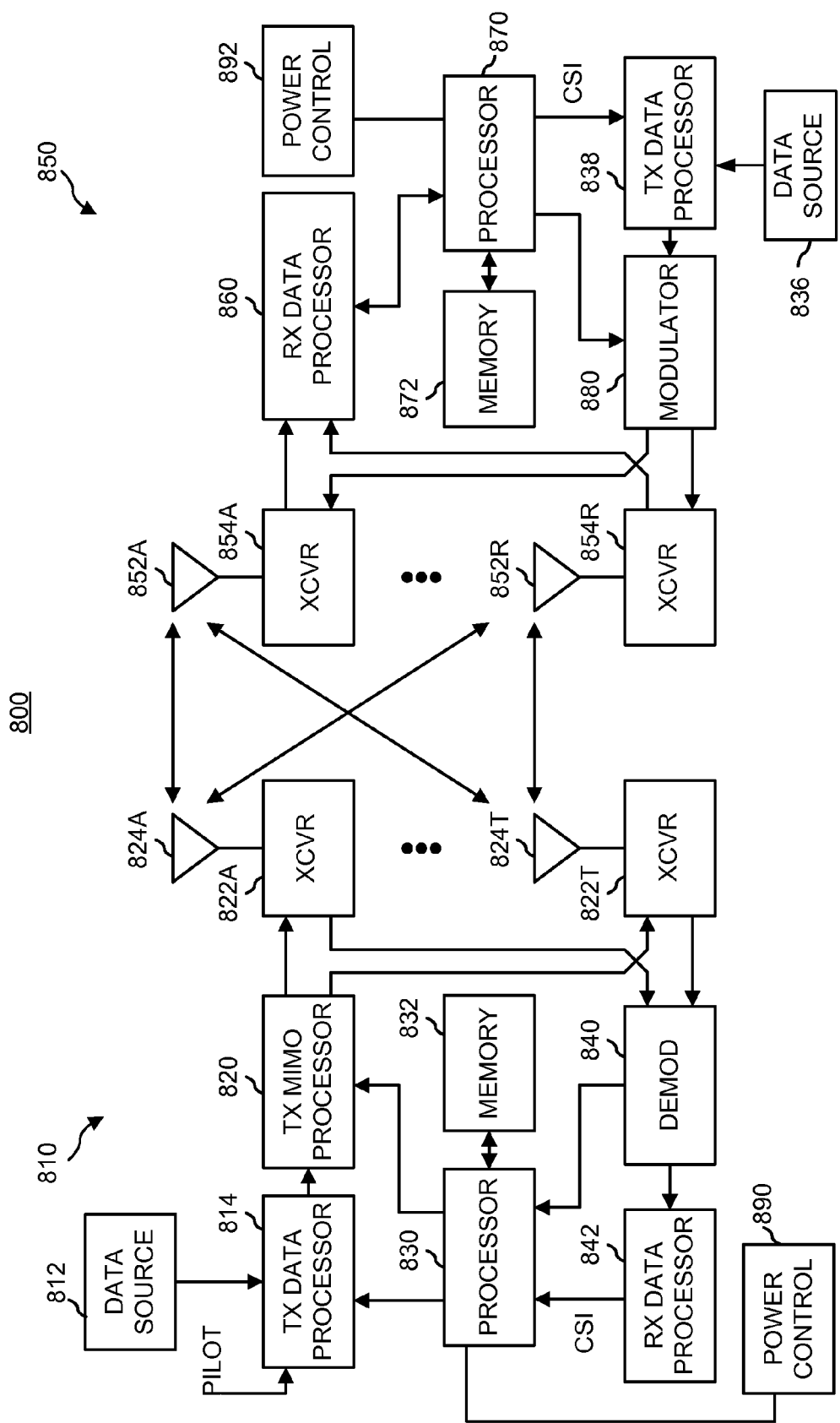
FIG. 8 is a simplified block diagram of several sample aspects of communication components.

The teachings herein may be incorporated into a device employing various components for communicating with at least one other wireless device. FIG. 8 depicts several sample components that may be employed to facilitate communication between devices. Specifically, FIG. 8 illustrates a device 810 (e.g., access point) and a device 850 (e.g., an access terminal) of a MIMO system 800. At the device 810, traffic data for a number of data streams is provided from a data source 812 to a transmit ("TX") data processor 814.

In some aspects, each data stream is transmitted over a respective transmit antenna. The TX data processor 814 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by a processor 830. A data memory 832 may store program code, data, and other information used by the processor 830 or other components of the device 810.

The modulation symbols for all data streams are then provided to a TX MIMO processor 820, which may further process the modulation symbols (e.g., for OFDM). The TX MIMO processor 820 then provides $N_T$ modulation symbol streams to $N_T$ transceivers ("XCVR") 822A through 822T. In certain embodiments, the TX MIMO processor 820 applies beam-forming weights to the symbols of the data streams and to the antenna from which the symbol is being transmitted.

Each transceiver 822 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transceivers 822A through 822T are then transmitted from $N_T$ antennas 824A through 824T, respectively.

At the device 850, the transmitted modulated signals are received by $N_R$ antennas 852A through 852R and the received signal from each antenna 852 is provided to a respective transceiver ("XCVR") 854A through 854R. Each transceiver 854 conditions (e.g., filters, amplifies, and downconverts) a respective received signal, digitizes the conditioned signal to provide samples, and further processes the samples to provide a corresponding "received" symbol stream.

A receive ("RX") data processor 860 then receives and processes the $N_R$ received symbol streams from $N_R$ transceivers 854 based on a particular receiver processing technique to provide $N_T$ "detected" symbol streams. The RX data processor 860 then demodulates, deinterleaves, and decodes each detected symbol stream to recover the traffic data for the data stream. The processing by the RX data processor 860 is complementary to that performed by the TX MIMO processor 820 and the TX data processor 814 at the device 810.

A processor 870 periodically determines which pre-coding matrix to use (discussed below). The processor 870 formulates a reverse link message comprising a matrix index portion and a rank value portion. A data memory 872 may store program code, data, and other information used by the processor 870 or other components of the device 850.

The reverse link message may comprise various types of information regarding the communication link and/or the received data stream. The reverse link message is then processed by a TX data processor 838, which also receives traffic data for a number of data streams from a data source 836, modulated by a modulator 880, conditioned by the transceivers 854A through 854R, and transmitted back to the device 810.

At the device 810, the modulated signals from the device 850 are received by the antennas 824, conditioned by the transceivers 822, demodulated by a demodulator ("DEMOD") 840, and processed by a RX data processor 842 to extract the reverse link message transmitted by the device 850. The processor 830 then determines which pre-coding matrix to use for determining the beam-forming weights then processes the extracted message.

FIG. 8 also illustrates that the communication components may include one or more components that perform power control operations as taught herein. For example, a power control component 890 may cooperate with the processor 830 and/or other components of the device 810 to send/receive signals to/from another device (e.g., device 850) as taught herein. Similarly, a power control component 892 may cooperate with the processor 870 and/or other components of the device 850 to send/receive signals to/from another device (e.g., device 810). It should be appreciated that for each device 810 and 850 the functionality of two or more of the described components may be provided by a single component. For example, a single processing component may provide the functionality of the power control component 890 and the processor 830 and a single processing component may provide the functionality of the power control component 892 and the processor 870.

The teachings herein may be incorporated into (e.g., implemented within or performed by) a variety of apparatuses (e.g., devices). For example, some wireless devices may be configured or referred to as a Base Station ("BS"), an access point ("AP"), NodeB, Radio Network Controller ("RNC"), eNodeB, Base Station Controller ("BSC"), Base Transceiver Station ("BTS"), Transceiver Function ("TF"), Radio Router, Radio Transceiver, Basic Service Set ("BSS"), Extended Service Set ("ESS"), Radio Base Station ("RBS"), or some other terminology. Other wireless devices (e.g., wireless terminals) may be referred to as subscriber stations. A subscriber station also may be known as a subscriber unit, a mobile station, a remote station, a remote terminal, an access terminal, a user terminal, a user agent, a user device, or user equipment. In some implementations a subscriber station may comprise a cellular telephone, a cordless telephone, a Session Initiation Protocol ("SIP") phone, a wireless local loop ("WLL") station, a personal digital assistant ("PDA"), a handheld device having wireless connection capability, or some other suitable processing device connected to a wireless modem. Accordingly, one or more aspects taught herein may be incorporated into a phone (e.g., a cellular phone or smart phone), a computer (e.g., a laptop), a portable communication device, a portable computing device (e.g., a personal data assistant), an entertainment device (e.g., a music or video device, or a satellite radio), a global positioning system device, or any other suitable device that is configured to communicate via a wireless medium.

As mentioned above, in some aspects a wireless device may comprise an access device (e.g., a cellular, Wi-Fi, or WiMAX access point) for a communication system. Such an access device may provide, for example, connectivity for or to a network (e.g., a wide area network such as the Internet or a cellular network) via a wired or wireless communication link. Accordingly, the access device may enable another device (e.g., a Wi-Fi or WiMAX station) to access the network or some other functionality.

A wireless device may communicate via one or more wireless communication links that are based on or otherwise support any suitable wireless communication technology. For example, in some aspects a wireless device may associate with a network. In some aspects the network may comprise a local area network or a wide area network. A wireless device may support or otherwise use one or more of a variety of wireless communication technologies, protocols, or standards such as, for example, CDMA, TDMA, OFDM, OFDMA, WiMAX, and Wi-Fi. Similarly, a wireless device may support or otherwise use one or more of a variety of corresponding modulation or multiplexing schemes. A wireless device may thus include appropriate components (e.g., air interfaces) to establish and communicate via one or more wireless communication links using the above or other wireless communication technologies. For example, a device may comprise a wireless transceiver with associated transmitter and receiver components (e.g., transmitters 726 and 728 and receivers 706 and 722) that may include various components (e.g., signal generators and signal processors) that facilitate communication over a wireless medium.

Figure 9:
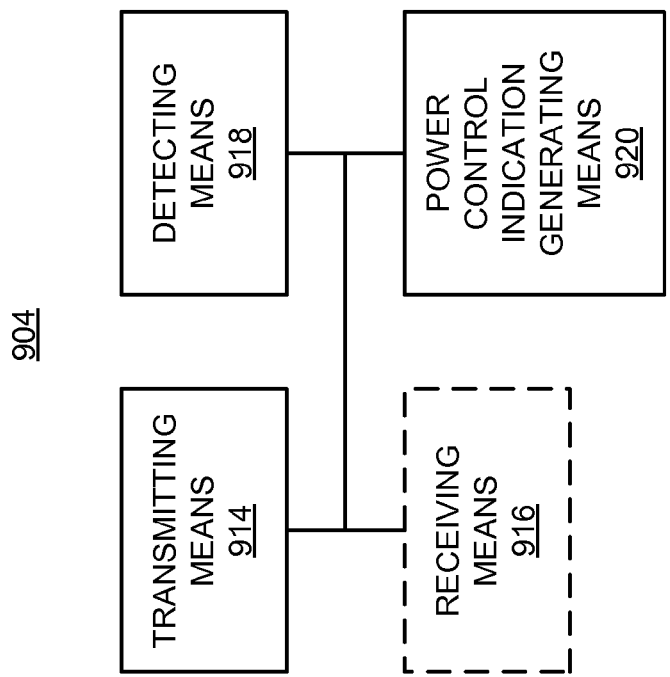
FIG. 9 is a simplified block diagram of several sample aspects of apparatuses configured to provide power control as taught herein.
Figure 9:
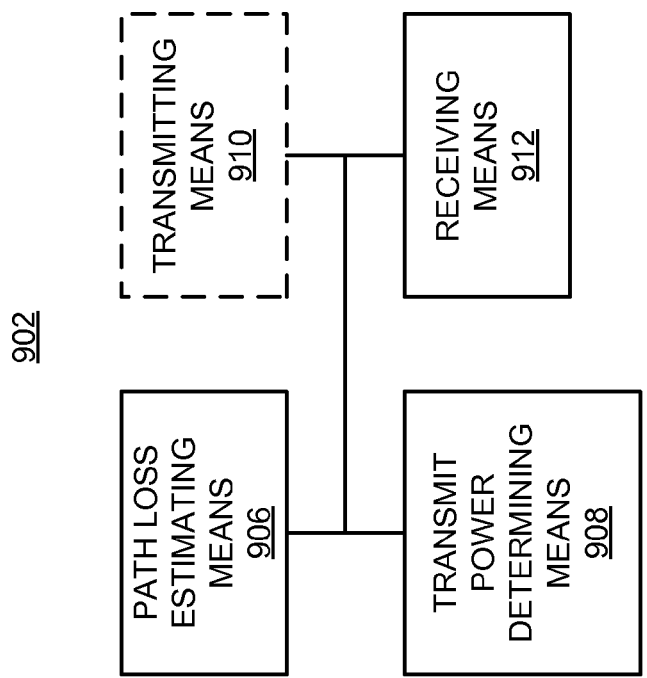

The components described herein may be implemented in a variety of ways. Referring to FIG. 9, apparatuses 902 and 904 are represented as a series of interrelated functional blocks. In some aspects the functionality of these blocks may be implemented as a processing system including one or more processor components. In some aspects the functionality of these blocks may be implemented using, for example, at least a portion of one or more integrated circuits (e.g., an ASIC). As discussed herein, an integrated circuit may include a processor, software, other related components, or some combination thereof. The functionality of these blocks also may be implemented in some other manner as taught herein. In some aspects one or more of the dashed blocks in FIG. 9 are optional.

The apparatuses 902 and 904 may include one or more modules that may perform one or more of the functions described above with regard to various figures. For example, a path loss estimating means 906 may correspond to, for example, a path loss estimator as discussed herein. A transmit power determining means 908 may correspond to, for example, a power controller as discussed herein. A transmitting means 910 and/or 914 may correspond to, for example, a transmitter as discussed herein. A receiving means 912 and/or 916 may correspond to, for example, a receiver as discussed herein. A detecting means 918 may correspond to, for example, an interference determiner as discussed herein. A power control indication generating means 920 may correspond to, for example, a power controller as discussed herein.

It should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that any of the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media may comprise RAM, ROM, EPROM, EEPROM, CD-ROM, flash memory, registers, or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media. In summary, it should be appreciated that a computer-readable medium may be implemented in any suitable computer-program product.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the scope of the disclosure. Thus, the present disclosure is not intended to be limited to the aspects shown herein but is to be accorded the widest scope consistent with the principles and novel features disclosed herein.

What is claimed is:

1. A method of power control for wireless communication, comprising:
    estimating, at a receiving station, path loss associated with a receive link;
    receiving a power control instruction that reflects a variation in interference and that informs the receiving station that its transmit power is to be adjusted; and
    determining, at the receiving station, transmit power for a transmit link based on the estimated path loss and the received power control instruction.

2. The method of claim 1, wherein:
    the receive link comprises a forward link from a base station to a subscriber station; and
    the transmit link comprises a reverse link from the subscriber station to the base station.

3. The method of claim 2, wherein the determination of transmit power is associated with open loop power control.

4. The method of claim 3, wherein the received power control instruction comprises at least one of the group consisting of: a unicast message and information for defining an $Offset\_BS_{perSS}$.

5. The method of claim 3, wherein the variance in interference is relative to a noise and interference indication received from the base station.

6. The method of claim 3, wherein the received power control instruction specifies a change in power based on at least one of the group consisting of: interference observed at the base station, quality of service associated with the subscriber station, HARQ associated with the subscriber station, a quantity of receive antennas, gain associated with at least one receive antenna.

7. The method of claim 3, wherein the determination of transmit power is further based on a carrier-to-noise coding scheme offset, a noise and interference indication received from the base station, and a repetition rate.

8. The method of claim 3, wherein the received power control instruction comprises a closed loop power control message.

9. The method of claim 2, wherein the estimation of path loss comprises determining a signal power level associated with a control message that is received from the base station via the forward link.

10. The method of claim 2, wherein the estimation of path loss is based on antennas configurations for the forward and reverse links.

11. The method of claim 2, wherein changes in the estimation of path loss are filtered to mitigate large and/or transient changes.

12. The method of claim 2, wherein the estimation of path loss is based on movement of the subscriber station.

13. The method of claim 2, wherein the estimation of path loss is based on a location of the subscriber station.

14. The method of claim 2, further comprising transmitting a message indicative of the determined transmit power to maintain transmit power level synchronization between the base station and the subscriber station.

15. A method of power control for wireless communication, comprising:
    estimating path loss associated with a receive link;
    receiving a power control instruction that reflects a variation in interference;
    determining transmit power for a transmit link based on the estimated path loss and the received power control instruction, wherein a power control equation is used in the determination of the transmit power; and
    adapting at least one parameter of the power control equation when switching to an open loop power control mode from a closed loop power control mode so that the transmit power after the mode switch is substantially similar to the transmit power before the mode switch.

16. An apparatus for wireless communication power control, comprising:
    a path loss estimator adapted to estimate path loss associated with a receive link;
    a receiver adapted to receive a wireless communication signal including a power control instruction that reflects a variation in interference and that informs the apparatus that its transmit power is to be adjusted; and
    a power controller adapted to determine transmit power for a transmit link based on the estimated path loss and the received power control instruction.

17. The apparatus of claim 16, wherein:
    the receive link comprises a forward link from a base station to a subscriber station; and
    the transmit link comprises a reverse link from the subscriber station to the base station.

18. The apparatus of claim 17, wherein the determination of transmit power is associated with open loop power control.

19. The apparatus of claim 18, wherein the received power control instruction comprises at least one of the group consisting of: a closed loop power control message, a unicast message, and information for defining an $Offset\_BS_{perSS}$.

20. The apparatus of claim 18, wherein the variance in interference is relative to a noise and interference indication received from the base station.

21. The apparatus of claim 18, wherein the received power control instruction specifies a change in power based on at least one of the group consisting of: interference observed at the base station, quality of service associated with the subscriber station, HARQ associated with the subscriber station, a quantity of receive antennas, gain associated with at least one receive antenna.

22. The apparatus of claim 18, wherein the power controller is further adapted to determine the transmit power based on a carrier-to-noise coding scheme offset, a noise and interference indication received from the base station, and a repetition rate.

23. The apparatus of claim 17, wherein the path loss estimator is further adapted to estimate the path loss by determining a signal power level associated with a control message that is received from the base station via the forward link.

24. The apparatus of claim 17, wherein the path loss estimator is further adapted to estimate the path loss based on antennas configurations for the forward and reverse links.

25. The apparatus of claim 17, wherein the path loss estimator is further adapted to filter changes in the estimation of path loss to mitigate large and/or transient changes.

26. The apparatus of claim 17, wherein the path loss estimator is further adapted to estimate the path loss based on movement of the subscriber station.

27. The apparatus of claim 17, wherein the path loss estimator is further adapted to estimate the path loss based on a location of the subscriber station.

28. The apparatus of claim 17, further comprising a transmitter adapted to transmit a message indicative of the determined transmit power to maintain transmit power level synchronization between the base station and the subscriber station.

29. An apparatus for wireless communication power control, comprising:
a path loss estimator adapted to estimate path loss associated with a receive link;
a receiver adapted to receive a wireless communication signal including a power control instruction that reflects a variation in interference; and
a power controller adapted to:
determine transmit power for a transmit link based on the estimated path loss and the received power control instruction;
determine the transmit power based on a power control equation; and
adapt at least one parameter of the power control equation when switching to an open loop power control mode from a closed loop power control mode so that the transmit power after the mode switch is substantially similar to the transmit power before the mode switch.

30. An apparatus for wireless communication power control, comprising:
means for estimating path loss associated with a receive link;
means for receiving a wireless communication signal including a power control instruction that reflects a variation in interference and that informs the apparatus that its transmit power is to be adjusted; and
means for determining transmit power for a transmit link based on the estimated path loss and the received power control instruction.

31. The apparatus of claim 30, wherein:
the receive link comprises a forward link from a base station to a subscriber station; and
the transmit link comprises a reverse link from the subscriber station to the base station.

32. The apparatus of claim 31, wherein the determination of transmit power is associated with open loop power control.

33. The apparatus of claim 32, wherein the received power control instruction comprises at least one of the group consisting of: a closed loop power control message, a unicast message, and information for defining an $Offset\_BS_{perSS}$.

34. The apparatus of claim 32, wherein the variance in interference is relative to a noise and interference indication received from the base station.

35. The apparatus of claim 32, wherein the received power control instruction specifies a change in power based on at least one of the group consisting of: interference observed at the base station, quality of service associated with the subscriber station, HARQ associated with the subscriber station, a quantity of receive antennas, gain associated with at least one receive antenna.

36. The apparatus of claim 32, wherein the means for determining determines the transmit power based on a carrier-to-noise coding scheme offset, a noise and interference indication received from the base station, and a repetition rate.

37. The apparatus of claim 31, wherein the means for estimating estimates the path loss by determining a signal power level associated with a control message that is received from the base station via the forward link.

38. The apparatus of claim 31, wherein the means for estimating estimates the path loss based on antennas configurations for the forward and reverse links.

39. The apparatus of claim 31, wherein the means for estimating filters changes in the estimation of path loss to mitigate large and/or transient changes.

40. The apparatus of claim 31, wherein the means for estimating estimates the path loss based on movement of the subscriber station.

41. The apparatus of claim 31, wherein the means for estimating estimates the path loss based on a location of the subscriber station.

42. The apparatus of claim 31, further comprising means for transmitting a message indicative of the determined transmit power to maintain transmit power level synchronization between the base station and the subscriber station.

43. An apparatus for wireless communication power control, comprising:
means for estimating path loss associated with a receive link;
means for receiving a wireless communication signal including a power control instruction that reflects a variation in interference; and
means for determining transmit power for a transmit link based on the estimated path loss and the received power control instruction, wherein the means for determining is further adapted to:
determine the transmit power based on a power control equation; and
adapt at least one parameter of the power control equation when switching to an open loop power control mode from a closed loop power control mode so that the transmit power after the mode switch is substantially similar to the transmit power before the mode switch.

44. A computer-program product for wireless communication power control, comprising:
a non-transitory computer-readable medium comprising code for causing at least one computer to:
estimate path loss associated with a receiver side of a receive link;

receive a power control instruction that reflects a variation in interference and that informs the receiver side of the receive link that its transmit power is to be adjusted; and determine transmit power for a transmit link based on the estimated path loss and the received power control instruction.

45. A method of power control for wireless communication, comprising:

detecting a variation in interference at a base station;

generating, at the base station, a power control instruction based on the variation in interference and configured to inform a subscriber station that its transmit power is to be adjusted; and transmitting the power control instruction to the subscriber station when the subscriber station is using open loop power control.

46. The method of claim 45, wherein:

the base station transmits the power control instruction to the subscriber station via a forward link; and the open loop power control is used by the subscriber station to determine transmit power for transmitting to the base station via a reverse link.

47. The method of claim 46, wherein the transmit power is determined based on the power control instruction, a carrier-to-noise coding scheme offset, a noise and interference indication from the base station, and a repetition rate.

48. The method of claim 45, wherein the variance in interference is relative to a noise and interference indication that is broadcast by the base station.

49. The method of claim 45, wherein the power control instruction comprises at least one of the group consisting of: a closed loop power control message, a unicast message, and information for defining an Offset_BS$_{perSS}$ parameter.

50. The method of claim 45, wherein the generation of the power control instruction is further based on at least one of the group consisting of: interference observed at the base station, quality of service associated with the subscriber station, HARQ associated with the subscriber station, a quantity of receive antennas, gain associated with at least one receive antenna.

51. The method of claim 45, further comprising receiving a message from the subscriber station indicative of transmit power of the subscriber station when using the open loop power control, wherein the generation of the power control instruction further comprises maintaining transmit power level synchronization between the base station and the subscriber station.

52. An apparatus for wireless communication power control, comprising:

an interference detector adapted to detect a variation in interference at a base station;

a power controller of the base station adapted to generate a power control instruction based on the variation in interference and configured to inform a subscriber station that its transmit power is to be adjusted; and a wireless communication transmitter adapted to transmit the power control instruction to the subscriber station when the subscriber station is using open loop power control.

53. The apparatus of claim 52, wherein:

the base station transmits the power control instruction to the subscriber station via a forward link; and the open loop power control is used by the subscriber station to determine transmit power for transmitting to the base station via a reverse link.

54. The apparatus of claim 53, wherein the transmit power is determined based on the power control instruction, a carrier-to-noise coding scheme offset, a noise and interference indication from the base station, and a repetition rate.

55. The apparatus of claim 52, wherein the variance in interference is relative to a noise and interference indication that is broadcast by the base station.

56. The apparatus of claim 52, wherein the power control instruction comprises at least one of the group consisting of: a closed loop power control message, a unicast message, and information for defining an Offset_BS$_{perSS}$ parameter.

57. The apparatus of claim 53, wherein the power controller is further adapted to generate the power control instruction based on at least one of the group consisting of: interference observed at the base station, quality of service associated with the subscriber station, HARQ associated with the subscriber station, a quantity of receive antennas, gain associated with at least one receive antenna.

58. The apparatus of claim 52, further comprising a receiver adapted to receive a message from the subscriber station indicative of transmit power of the subscriber station when using the open loop power control, wherein the power controller is further adapted to generate the power control instruction to maintain transmit power level synchronization between the base station and the subscriber station.

59. An apparatus for wireless communication power control, comprising:

means for detecting a variation in interference at a base station;

means for generating, at the base station, a power control instruction based on the variation in interference and configured to inform a subscriber station that its transmit power is to be adjusted; and means for transmitting a wireless communication signal including the power control instruction to the subscriber station when the subscriber station is using open loop power control.

60. The apparatus of claim 59, wherein:

the base station transmits the power control instruction to the subscriber station via a forward link; and the open loop power control is used by the subscriber station to determine transmit power for transmitting to the base station via a reverse link.

61. The apparatus of claim 60, wherein the transmit power is determined based on the power control instruction, a carrier-to-noise coding scheme offset, a noise and interference indication from the base station, and a repetition rate.

62. The apparatus of claim 60, wherein the variance in interference is relative to a noise and interference indication that is broadcast by the base station.

63. The apparatus of claim 60, wherein the power control instruction comprises at least one of the group consisting of: a closed loop power control message, a unicast message, and information for defining an Offset_BS$_{perSS}$ parameter.

64. The apparatus of claim 60, wherein the means for generating generates the power control instruction based on at least one of the group consisting of: interference observed at the base station, quality of service associated with the subscriber station, HARQ associated with the subscriber station, a quantity of receive antennas, gain associated with at least one receive antenna.

65. The apparatus of claim 60, further comprising means for receiving a message from the subscriber station indicative of transmit power of the subscriber station when using the open loop power control, wherein the means for generating generates the power control instruction to maintain transmit power level synchronization between the base station and the subscriber station.

66. A computer-program product for wireless communication power control, comprising:
   a non-transitory computer-readable medium comprising code for causing at least one computer to:
   detect a variation in interference at a base station;
   generate, at the base station, a power control instruction based on the variation in interference and configured to inform a subscriber station that its transmit power is to be adjusted; and
   transmit the power control instruction to the subscriber station when the subscriber station is using open loop power control.

* * * * *